(12) United States Patent
Kosht et al.

(10) Patent No.: US 7,389,685 B2
(45) Date of Patent: Jun. 24, 2008

(54) DOWNHOLE PRESSURE TRANSMITTER

(75) Inventors: Danial L. Kosht, Gaylord, MI (US); Joseph M. Walling, Boyne City, MI (US); Mark G. Marino, Petoskey, MI (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/452,881

(22) Filed: Jun. 13, 2006

(65) Prior Publication Data

US 2007/0283752 A1 Dec. 13, 2007

(51) Int. Cl.
*E21B 47/00* (2006.01)
*G01L 7/04* (2006.01)

(52) U.S. Cl. ...................... 73/152.53; 73/743

(58) Field of Classification Search .............. 73/152.02, 73/152.51, 152.53, 732–743
See application file for complete search history.

(56) References Cited

U.S. PATENT DOCUMENTS

| | | | | |
|---|---|---|---|---|
| 2,679,757 A | * | 6/1954 | Fay | 374/102 |
| 2,908,881 A | * | 10/1959 | Pitzer | 338/40 |
| 3,013,233 A | * | 12/1961 | Bourns | 338/40 |
| 3,066,739 A | * | 12/1962 | Saurenman et al. | 166/141 |
| 3,145,359 A | * | 8/1964 | Parkinson | 338/40 |
| 3,180,152 A | * | 4/1965 | Metzger et al. | 73/384 |
| 3,232,115 A | * | 2/1966 | Bennett et al. | 73/735 |
| 3,247,720 A | * | 4/1966 | Hicks | 73/705 |
| 3,267,734 A | * | 8/1966 | Marks | 73/735 |
| 3,605,500 A | * | 9/1971 | Trekkell | 73/735 |
| 3,780,574 A | * | 12/1973 | Miller | 73/152.53 |
| 3,810,387 A | * | 5/1974 | Stancliff | 73/152.53 |
| 3,820,391 A | * | 6/1974 | Baker | 73/170.29 |
| 3,911,748 A | * | 10/1975 | Lindsay | 73/742 |
| 4,212,198 A | * | 7/1980 | Divine | 73/152.53 |
| 4,279,155 A | | 7/1981 | Balkanli | 73/368.6 |
| 4,567,921 A | | 2/1986 | King | 141/5 |
| 4,651,569 A | * | 3/1987 | Paros et al. | 73/704 |
| 4,805,448 A | * | 2/1989 | Armell | 73/152.53 |
| 5,008,664 A | | 4/1991 | More et al. | 340/854 |
| 5,503,013 A | * | 4/1996 | Zeller | 73/152.18 |
| 5,722,488 A | | 3/1998 | Normann et al. | 166/65.1 |
| 6,492,697 B1 | | 12/2002 | Plagens et al. | 257/426 |
| 6,538,576 B1 | | 3/2003 | Schultz et al. | 340/859.6 |
| 6,679,332 B2 | | 1/2004 | Vinegar et al. | 166/373 |
| 6,707,293 B2 | | 3/2004 | Wan et al. | 324/207.25 |

(Continued)

OTHER PUBLICATIONS

*Sensor Fundamentals 101*, PC 104 Fundamentals, PC/104 Embedded Solutions, Winter 2005.

(Continued)

*Primary Examiner*—Hezron E. Williams
*Assistant Examiner*—John Fitzgerald
(74) *Attorney, Agent, or Firm*—Kermit D. Lopez; Luis M. Ortiz

(57) ABSTRACT

A downhole pressure transmitter apparatus and method of making the same. A pressure fitting can be provided in association with a tube formed into a spiral shape. One end of said tube is sealed and the other end of said tube is affixed to said pressure fitting. As the tube is exposed to a differential pressure, said tube unwinds, thereby creating a rotary motion that is proportional and linear to said differential pressure sensor, thereby providing an indication of pressure within a downhole environment.

13 Claims, 4 Drawing Sheets

U.S. PATENT DOCUMENTS

| | | | |
|---|---|---|---|
| 6,759,843 B2 | 7/2004 | Furlong | 324/207.2 |
| 7,002,229 B2 | 2/2006 | Cohen | 257/426 |
| 7,152,700 B2 * | 12/2006 | Church et al. | 175/320 |
| 2004/0206170 A1 * | 10/2004 | Chen et al. | 73/152.49 |
| 2005/0103527 A1 * | 5/2005 | Church et al. | 175/62 |

OTHER PUBLICATIONS

*Ensuring Accurate Measurements Through Calibration of RVR Sensors.*

* cited by examiner

DOWNHOLE PRESSURE TRANSMITTER

TECHNICAL FIELD

Embodiments are generally related to the field of drilling and drilling equipment. Embodiments are generally related to sensing devices and methods thereof. Embodiments are also related to pressure sensors, including pressure transmitters.

BACKGROUND

In modern drilling operations, whether in the resource, utility or environmental industries, there presently exist many devices and methods for measuring and determining the composition of geological sites, drill bit environments, and environmental waste sites. There is also a need to keep track of pressure and temperature variations during drilling operations.

In the oil drilling and environmental remediation industries, for example, drilling requires operating through boreholes rather than excavating entire sites and treating contaminated soil above ground. If drilled solids contain toxic or radioactive substances, the cost of drilling increases due to worker safety concerns as well as the need to collect, document, dispose of drill cuttings of rock and other subterranean materials brought to the surface, and to decontaminate drilling equipment. Once a site is characterized, wells are typically drilled in which to position barriers, or to inject or pump out toxic subsurface fluids. Such wells must be drilled horizontally or diagonally, a method called directional drilling. Directional drilling is the process of using a drill bit to drill a borehole in a specific direction to achieve a specific drilling objective. Measurements concerning the drift angle, the azimuth, and tool face orientation all aid in directional drilling. Sensor devices can also be normally utilized in directional drilling operations to characterize a given geological or environmental waste site. A need exists for making evasive sensor measurements during such drilling operations.

Temperature and/or pressure sensors, for example, can be adapted for use in drilling operations. Various sensors are known in the pressure sensing arts. Pressure transducers are well known in the art. One example of a pressure transducer is a device formed with a silicon substrate and an epitaxial layer, which is grown on the substrate and implemented in the context of a solid state device. One of the major problems with such pressure transducer devices is that such devices are not reliable in corrosive, high-pressure and/or high-temperature applications. Measuring pressure in downhole drilling operations utilizing sensing technologies is both expensive and unreliable. A need therefore exists for a low-cost reliable high accuracy pressure measurement device that can be used in downhole drilling operations.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention is to provide an apparatus and a method which overcomes the above noted prior art limitations.

It another aspect of the present invention to provide an improved sensor apparatus and method.

It is an additional aspect of the present invention to provide for an improved pressure transmitter apparatus method and apparatus.

It is a further aspect of the present invention to provide an electromechanical approach for implementing down pressure transmitters utilized in drilling operations.

The aforementioned aspects of the invention and other objectives and advantages can now be achieved as described herein. A downhole pressure transmitter apparatus and method of making the same is disclosed. In general, a pressure fitting can be provided in association with a tube formed into a spiral shape. One end of said tube is sealed and the other end of said tube is affixed to said pressure fitting. As the tube is exposed to a differential pressure, said tube unwinds, thereby creating a rotary motion that is proportional and linear to said differential pressure sensor, thereby providing an indication of pressure within a downhole environment.

In accordance with one embodiment, a hollow tube, referred to as a Bourdon tube can be utilized and formed into a spiral shape. One end of the tube is sealed and the other end is affixed to the pressure fitting. As the tube is exposed to a pressure differential (between the pressure inside the tube and outside the tube) it unwinds creating a rotary motion. The rotary motion of the coil is proportional and linear to the pressure differential. The rotary motion can be captured using one of several potential measurement technologies (e.g., RVDT, Potentiometer, Hall Effect, Magnetoresistive, Optical, Fiber Optic, etc.).

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 1:
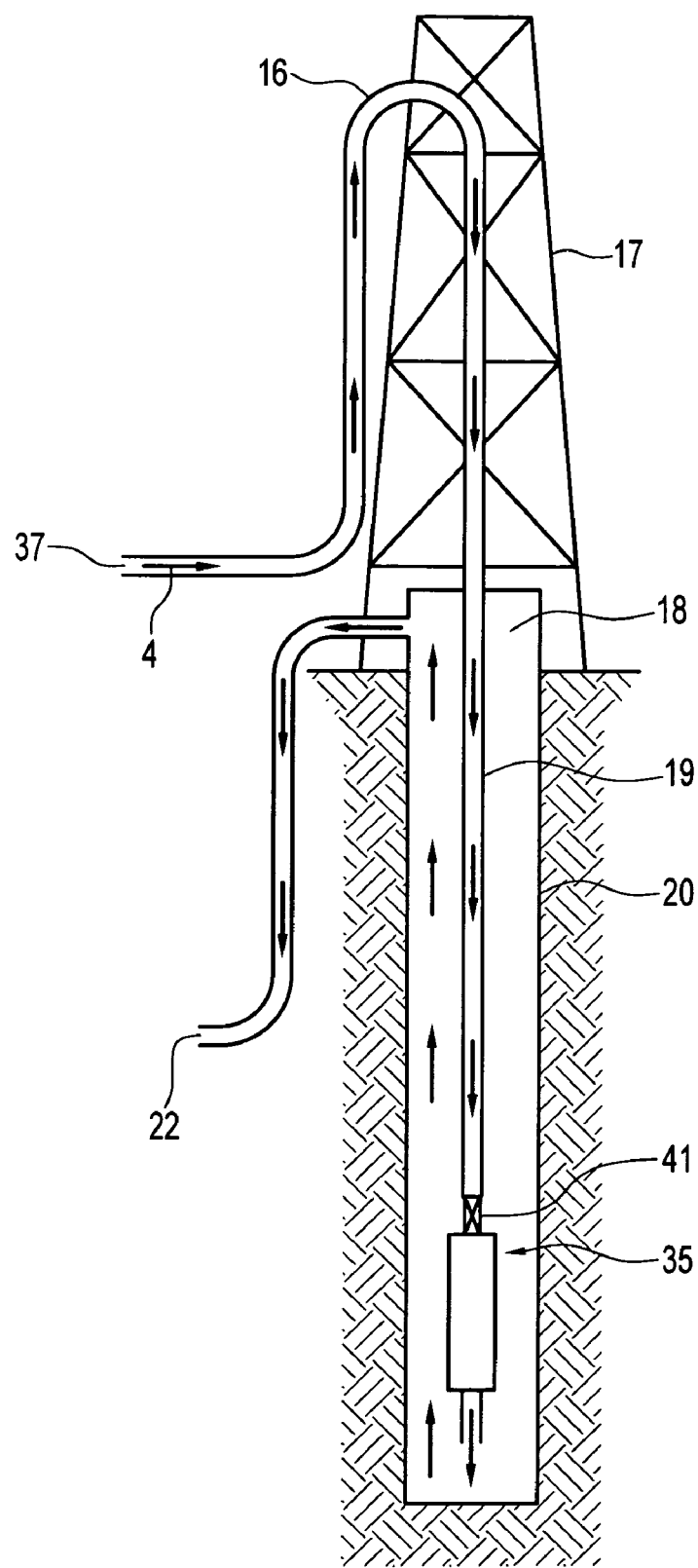
FIG. 1 illustrates a typical drilling operation in which a downhole pressure transmitter apparatus may be adapted for use, in accordance with one embodiment.

FIG. 1 illustrates a typical drilling operation in which a downhole pressure transmitter apparatus can be adapted for use, in accordance with one embodiment. As depicted in FIG. 1, a well bore 20, which may be open or cased, is generally disposed below a drilling rig 17. A drill string 19 with a drilling assembly 35 connected to the bottom, is disposed within the well 20, forming an annular flow area 18 between the drill string 19 and the well 20. On the surface, a mud pump (not shown) can be utilized to draw drilling fluid from the fluid reservoir (not shown) and pumps the fluid into the pump discharge line 37, along path 4. The circulating fluid flows, as shown by the arrows, into the drilling rig standpipe 16, through the drill string 19, and returns to the surface through the annulus 18. After reaching the surface, the circulating fluid is returned to the fluid reservoir via the pump return line 22.

The configuration depicted in FIG. 1 makes use of a downhole assembly 35 that communicates with a valve 41. Fluid can be pumped down the drill string 19. A momentary restriction may cause a pressure increase which is detectable by a pressure sensor. The configuration depicted in FIG. 1 represents one of many possible downhole drilling configurations in which the embodiments described herein can be implemented and is not considered a limiting feature of the present invention. For example, embodiments can be implemented in the context of other types of drilling operations, such as directional drilling operations.

Figure 2:
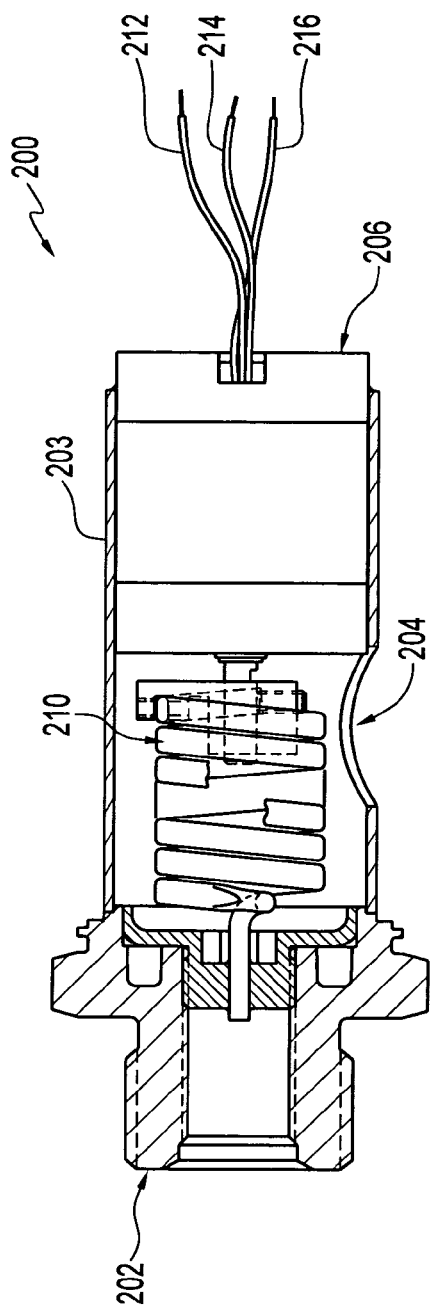
FIG. 2 illustrates a side sectional view of a downhole pressure transmitter apparatus, which can be implemented in accordance with a preferred embodiment.
Figure 3:
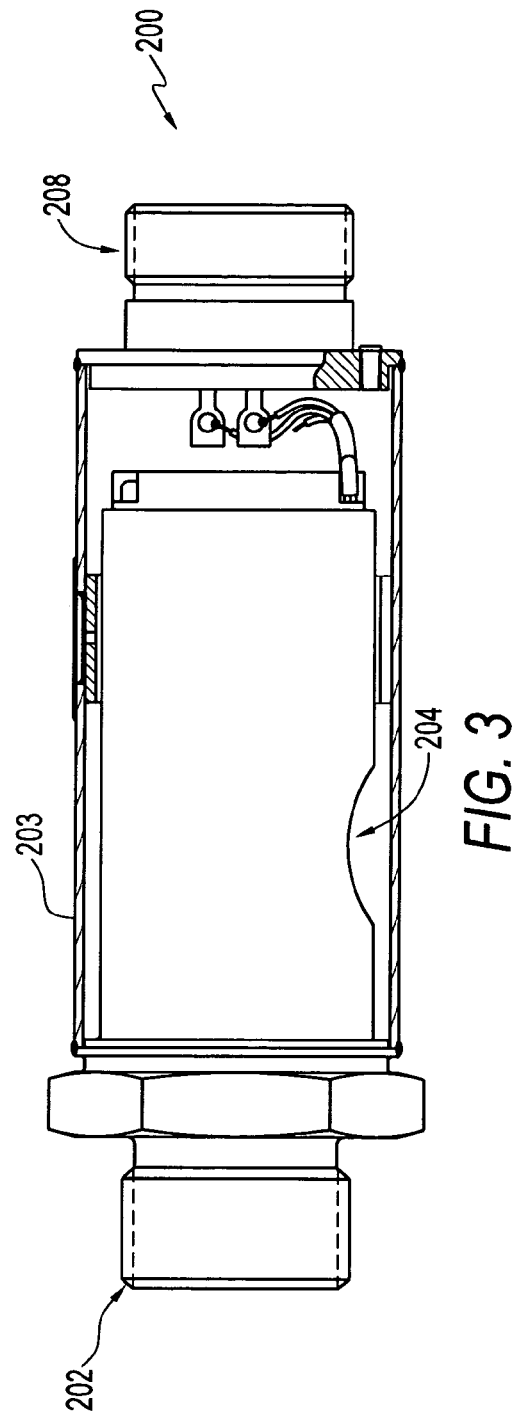
FIG. 3 illustrates a top sectional view of the downhole pressure transmitter apparatus depicted in FIG. 2 in accordance with a preferred embodiment.

FIG. 2 illustrates a side sectional view of a downhole pressure transmitter apparatus 200, which can be implemented in accordance with a preferred embodiment. FIG. 3 illustrates a top sectional view of the downhole pressure transmitter apparatus 200 depicted in FIG. 2 in accordance with a preferred embodiment. Note that in FIGS. 2-3, identical or similar parts or elements are generally indicated by identical reference numerals. The downhole pressure transmitter apparatus can be located, for example, within or in association with the downhole assembly 35 illustrated in FIG. 1, and can be utilized to measure hydraulic pressures for downhole drilling equipment.

The downhole pressure transmitter apparatus 200 generally includes a pressure fitting 202, which can be connected to or in communication with a spiral shaped tube 210 located within a housing 203. A calibration window 204 can be provided in association with the housing 203 in order to permit calibration of the downhole pressure transmitter apparatus 200. A sensing element 206 can be encased by or connected to the housing 203. A plurality of lead wires can extend from housing 203 and may communicate electrically with the sensing element 206. A connector 208 can also be provided, which can be utilized to connect the downhole pressure transmitter apparatus 200 to another device or unit, such as, for example the downhole assembly 35 illustrated in FIG. 1.

The tube 210 can be provided as a hollow tube, referred to as a Bourdon tube, and can be formed into a spiral shape. In general, a Bourdon Tube is a pressure measurement device and can be used in applications where relatively static pressure measurements are needed. A typical Bourdon tube contains a curved tube that is open to external pressure input on one end and is coupled mechanically to an indicating needle on the other end.

One end of the tube 210 is sealed and the other end is affixed to the pressure fitting 202. As the tube 210 is exposed to a pressure differential (i.e., between the pressure inside the tube 210 and outside the tube 210), the tube 210 unwinds, thereby creating a rotary motion. The tube 210 thus forms a coil. The rotary motion of the coil is proportional and linear to the pressure differential. The rotary motion can be captured using one of a number potential measurement technologies (e.g., RVDT, Potentiometer, Hall Effect, Magnetoresistive, Optical, Fiber Optic, etc.). For example, the sensing element 206 can function as a measurement device, such as an RVDT device, an RVR device, a Hall Effect sensor, a magnetoresistive sensor, or a fiber optic based sensor, depending upon design considerations.

An Rotational Variable Differential Transformer (RVDT) device is a sensor that can be used to measure rotational angles. One example of a Hall effect sensor that may be implemented in accordance with one potential embodiment is disclosed in U.S. Pat. No. 7,002,229, entitled "Self Aligned Hall With Field Plate," which issued to Isaac D. Cohen on Feb. 21, 2006. U.S. Pat. No. 7,002,229 is assigned to Honeywell International Inc. of Morristown, N.J., and is incorporated herein by reference. An example of a magnetoresistive sensor and/or Hall Effect sensor, which can also be adapted for use in accordance with one or more embodiments, is disclosed in U.S. Pat. No. 6,759,843, entitled "Sensing Methods and Systems for Hall and/or MR Sensors," which issued to Gregory R. Furlong on Jul. 6, 2004. U.S. Pat. No. 6,759,843 is assigned to Honeywell International Inc. of Morristown, N.J., and is incorporated herein by reference, The downhole pressure transmitter apparatus 200 offers a number of advantages and benefits. For example, apparatus 200 provides for media isolation, in that it isolates the measurement media from the sensing element 206. Apparatus 200 also offers high-temperature performance capabilities because it does not utilize silicon based electronics. The temperature range is limited only by the yield stress vs. temperature of the Bourdon Tube 210 and the limitations of the rotary sensing technology. Apparatus 200 additionally offers a flexible output format due to its inherent failure detection capabilities. Because apparatus 200 does not use silicon based electronics, the number of failure modes are dramatically reduced. The remaining failure modes such as broken or shorted wires can be detected and the monitoring system can respond accordingly.

Figure 4:
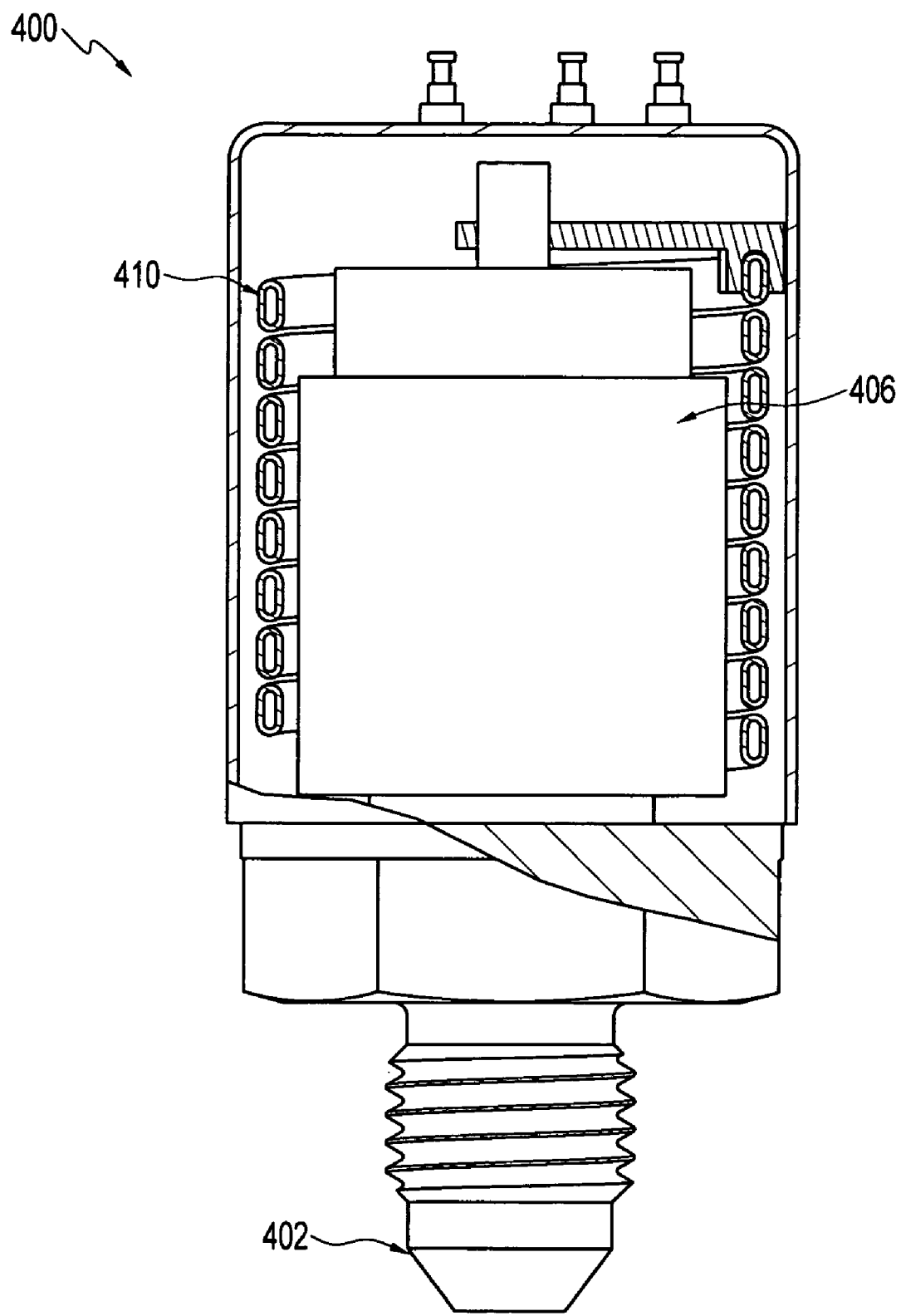
FIG. 4 illustrates a two-dimensional cross-sectional view of a downhole pressure transmitter apparatus, which can be implemented in accordance with an alternative embodiment.
Figure 5:
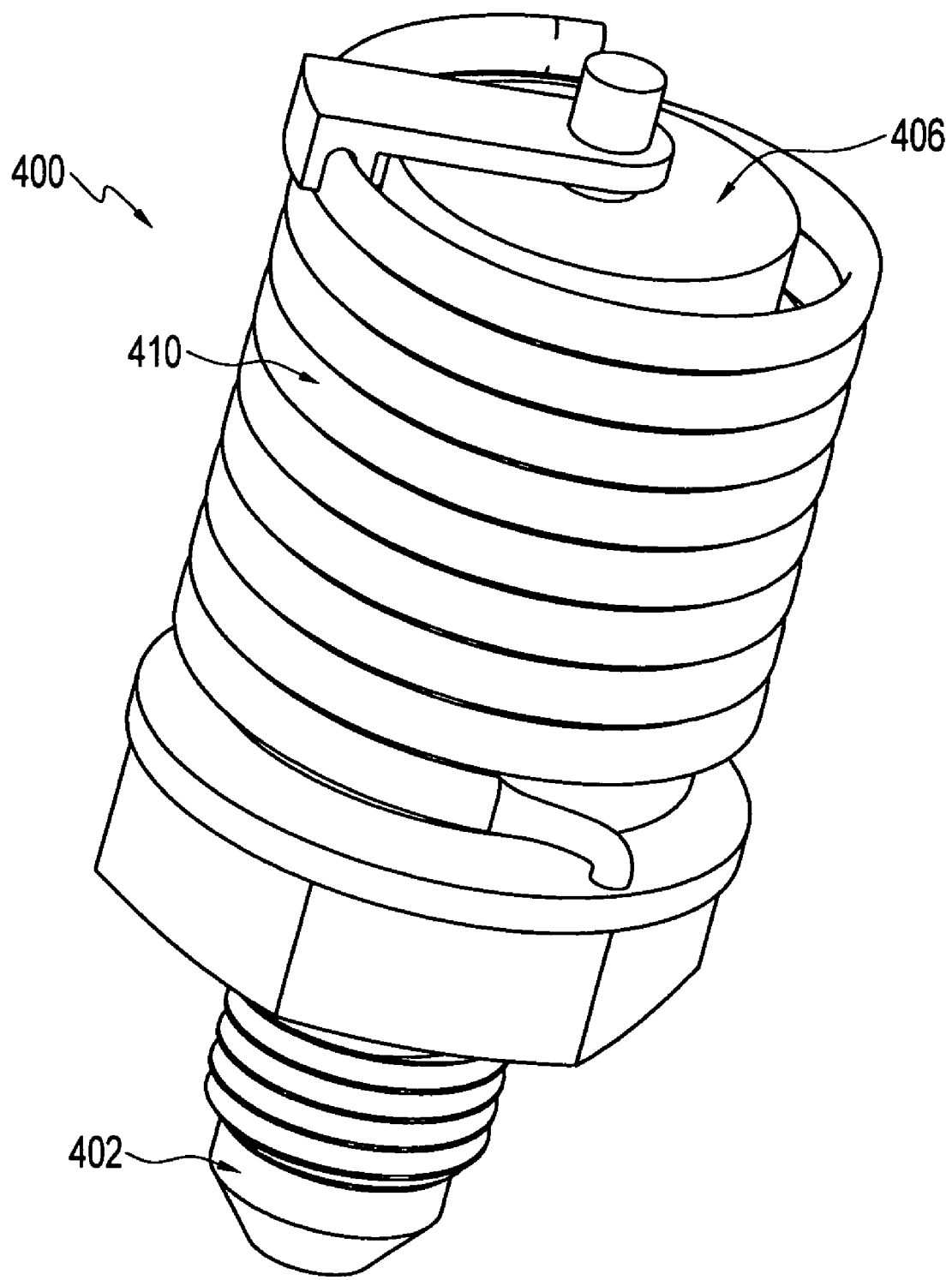
FIG. 5 illustrates an isometric view of the downhole pressure transmitter apparatus depicted in FIG. 4.

FIG. 4 illustrates a two-dimensional cross-sectional view of a downhole pressure transmitter apparatus 400, which can be implemented in accordance with an alternative embodiment. FIG. 5 illustrates an isometric view of the downhole pressure transmitter apparatus 400 depicted in FIG. 4 in accordance with an alternative embodiment. Note that the configuration depicted in FIGS. 4-5 is similar to that depicted in FIGS. 1-3, the difference being that apparatus 400 utilizes a Bourdon tube 402 that is wrapped around the sensing element 406. Apparatus 400 generally includes a pressure fitting 402 similar to that of the configuration of FIG. 1-3. The configuration depicted in FIGS. 4-5 is, however, more compact than the configuration depicted in FIGS. 1-3 and is applicable across a number of different industrial, commercial and consumer applications.

It is contemplated that the use of the present invention can involve components having different characteristics. It is intended that the scope of the present invention be defined by the claims appended hereto, giving full cognizance to equivalents in all respects.

What is claimed is:

1. A downhole pressure transmitter apparatus, comprising; a housing and a calibration window in said housing; a nonsilicon based sensing element maintained within said housing; a pressure fitting connected to said housing; and a tube formed into a spiral shape, wherein one end of said tube is sealed and another end of said tube is affixed to said pressure fitting, wherein as said tube is exposed to a differential pressure, said tube unwinds, thereby creating a rotary motion that is proportional and linear to said differential pressure, thereby providing an indication of pressure within a downhole environment.

2. The apparatus of claim 1 wherein said tube comprises a Bourdon tube.

3. The apparatus of claim 1 wherein said rotary motion is captured utilizing said sensing element.

4. The apparatus of claim 3 wherein said sensing element comprises an RVDT device.

5. The apparatus of claim 3 wherein said sensing element comprises a Hall Effect sensor.

6. The apparatus of claim 3 wherein said sensing element comprises a magnetoresistive sensor.

7. The apparatus of claim 3 wherein said sensing element comprises a fiber optic based sensor.

8. The apparatus of claim 3 wherein said Bourdon tube is wrapped around said sensing element.

9. A method for forming a downhole pressure transmitter apparatus, comprising:
   providing a calibration window and a nonsilicon based sensing element within a housing;
   providing a pressure fitting connected to said housing; and
   configuring a tube into a spiral shape;
   sealing one end of said tube;
   affixing another end of said tube to said pressure fitting, wherein as said tube is exposed to a differential pressure, said tube unwinds, thereby creating a rotary motion that is proportional and linear to said differential pressure, thereby forming a downhole pressure transmitter apparatus that provides an indication of pressure within a downhole environment.

10. The method of claim 9 wherein said tube comprises a Bourdon tube.

11. The method of claim 9 wherein said downhole environment comprises a drilling environment.

12. The method of claim 9 further comprising providing said sensing element for capturing said rotary motion.

13. The method of claim 12 further comprising wrapping said tube about said sensing element.

* * * * *